(No Model.)

A. T. DORA.
SALT PAN.

No. 461,740. Patented Oct. 20, 1891.

WITNESSES:
Chas. Nida
C. Sedgwick

INVENTOR:
A. T. Dora
BY Munn & Co.
ATTORNEYS

UNITED STATES PATENT OFFICE.

ALVIN T. DORA, OF HUTCHINSON, KANSAS.

SALT-PAN.

SPECIFICATION forming part of Letters Patent No. 461,740, dated October 20, 1891.

Application filed January 21, 1891. Serial No. 378,536. (No model.)

*To all whom it may concern:*

Be it known that I, ALVIN T. DORA, of Hutchinson, in the county of Reno and State of Kansas, have invented a new and Improved Salt-Pan, of which the following is a full, clear, and exact description.

My invention relates to improvements in that variety of pans which are used in evaporating salt brine. The pans which are ordinarily used for the purpose have flat bottoms and the salt which accumulates on the bottom of the pan is scraped out with hand-rakes, and a great difficulty in using the pans of this description is that the salt scales become attached to the pan, so that the pan rapidly burns out.

The object of my invention is to obviate this difficulty by providing means for constantly raking the salt from the bottom of the pan, and also to produce a pan having a large heating-surface and having means for constantly stirring the brine and preventing the accumulation of salt on the pan-bottom.

To this end my invention consists in certain features of construction and combinations of parts which will be hereinafter described and claimed.

Reference is to be had to the accompanying drawings, forming a part of this specification, in which similar letters of reference indicate corresponding parts in both the figures.

Figure 1:
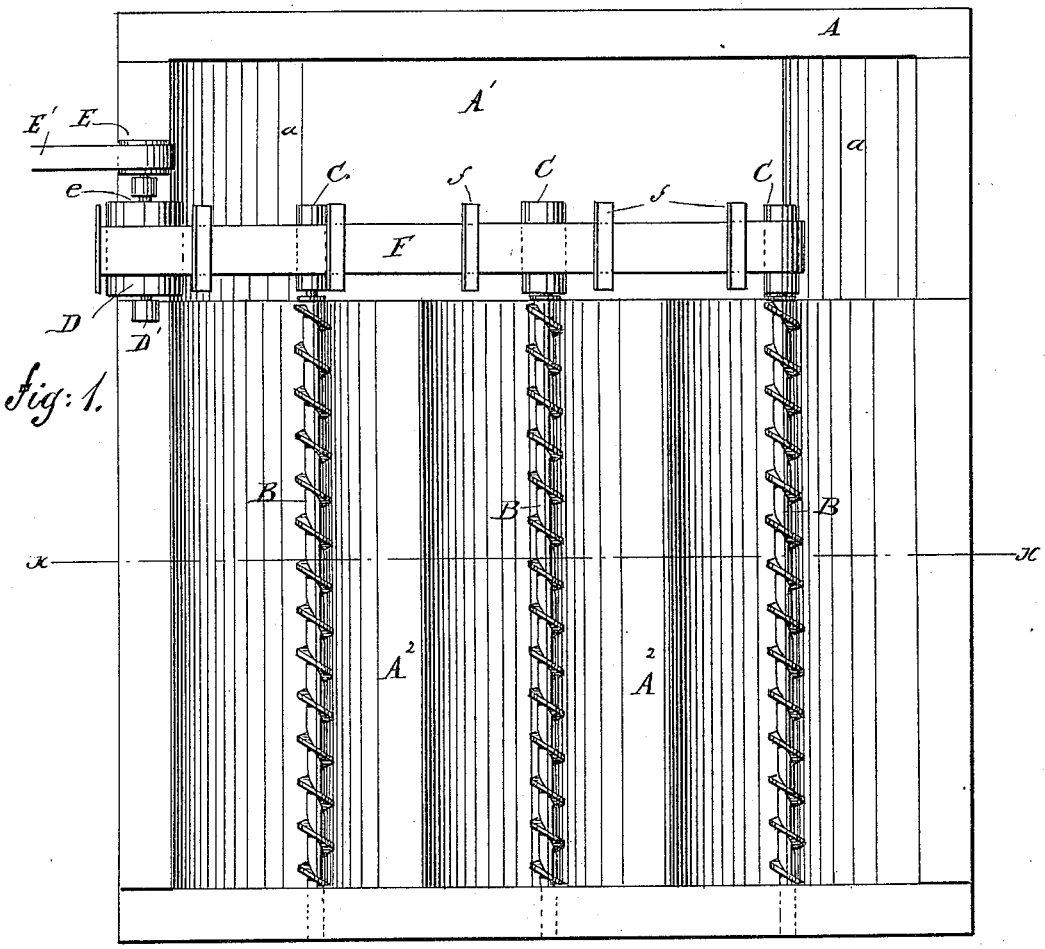
Figure 2:
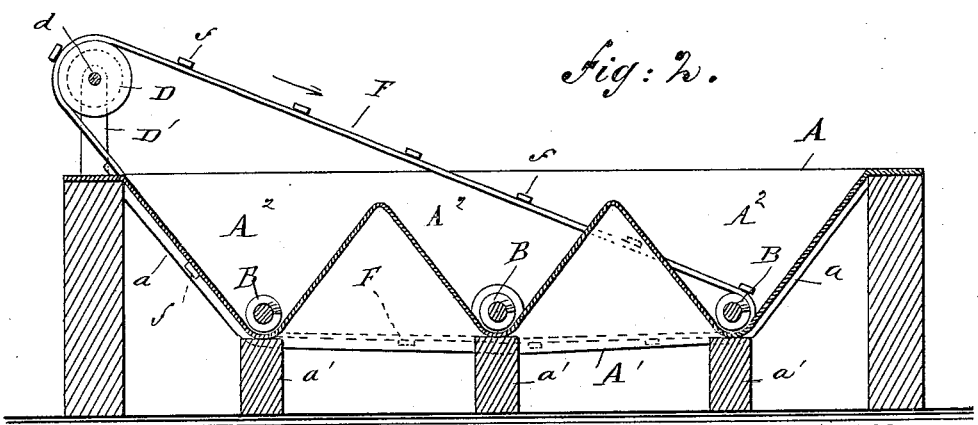

Figure 1 is a plan view of the pan and apparatus embodying my invention, and Fig. 2 is a vertical cross-section on the line $x\ x$ of Fig. 1.

The pan A is mounted upon suitable brick-work in the ordinary way, and the pan at one end has a flat or nearly flat bottom A', with sloping sides $a$, and the remaining portion of the pan is provided with a series of longitudinal troughs or grooves $A^2$, which rest at the bottom upon suitable brick-work $a'$ and which at the top are a little below the top of the pan, so that when the pan is filled with brine the brine will cover the troughs. In the drawings I have shown three of these troughs; but it is obvious that the pan may be provided with any number. These troughs are arranged to deliver from the flat portion A' of the pan, and the lower portions of the troughs are a little higher than the flat pan-bottom.

A screw conveyer B extends longitudinally through each of the troughs, so that the conveyer-blades will strike the bottom of the trough, and the front ends of the conveyers extend over the flat bottom A' and are provided with pulleys C, by means of which they are turned. On one side of the pan A are brackets D', which support a shaft $d$, and the shaft is provided with a drum-pulley D, over which runs a belt F, the belt being also made to engage the pulleys C of the screw conveyers, so that the conveyers will be operated by the turning of the belt. In practice chain belts and sprocket-wheels may be substituted for the belt and pulleys, as the chain will better resist the action of the hot brine. The belt has cross-blocks $f$ secured to it at frequent intervals, the blocks being secured on the outer side, and as the belt moves the blocks come in contact with the flat bottom of the pan and scrape the salt from it up one of the inclined sides and deliver it into a conveyer, which may be provided to receive and deliver it in the packing-room. The shaft $d$ is turned by a belt E', which connects with some source of power and extends over a pulley E on the shaft.

In practice the troughs $A^2$ are kept entirely submerged in the brine, so that they will not be easily burned, and the salt which is precipitated by the heat will fall down the inclined sides of the trough, and as the conveyers are turned the salt will be carried, to the flat portion of the pan and withdrawn by the belt. The turning of the conveyers serves to keep the brine constantly stirred, and also keeps the bottoms of the troughs clean, so that heat may be applied directly to the pan without fear of burning it. This is a great advantage and facilitates the rapid evaporation of the brine.

It will be seen that by having the bottom of the pan formed into troughs, as described above, there is a great deal more heating-surface than in the ordinary flat-bottom pan, and as the bottom of the troughs and pan are both constantly scraped there is absolutely no danger of burning.

Having thus fully described my invention, I claim as new and desire to secure by Letters Patent—

1. A salt-pan having a part of its bottom corrugated and a part flattened, a series of conveyers operating in the corrugations, a conveyer or elevator at right angles to the first-named conveyers and operating across the flattened portion of the pan, and an operating mechanism.

2. A salt-pan having one end provided with a substantially flat bottom and the remaining portion of the bottom formed of a series of troughs, screw conveyers mounted in the troughs and arranged to deliver on the flat bottom, and means for operating the conveyers, substantially as described.

3. The combination, with the pan having one end flattened at the bottom and the remaining portion of the bottom formed into a series of troughs, of screw conveyers mounted in the bottoms of the troughs and provided with pulleys at one end, and a belt extending from a driving-pulley around the conveyer-pulleys, substantially as described.

4. The combination, with the pan having the flat and grooved bottom, of conveyers mounted in the grooves or troughs and arranged to deliver on the flat bottom, said conveyers having pulleys at the front end, and a driving-belt extending over said pulleys, the belt having transverse blocks thereon to contact with the bottom of the pan, substantially as described.

5. The combination, with the pan having a flat bottom with inclined sides at one end and the remaining portion of the bottom formed into a series of troughs, of screw conveyers mounted in the bottoms of the troughs and provided with pulleys at their front ends, a driving-pulley mounted at one side of the pan, and a belt extending over the driving-pulley and over the conveyer-pulleys, said belt having at its outer surface a series of blocks, substantially as described.

ALVIN T. DORA.

Witnesses:
J. M. JORDAN,
OLIVER MILLER.